(12) United States Patent  
Beggs

(10) Patent No.: US 8,858,311 B2  
(45) Date of Patent: *Oct. 14, 2014

(54) TRAVELING VIRTUAL PET GAME SYSTEM

(71) Applicant: Disney Enterprises, Inc., Burbank, CA (US)

(72) Inventor: Damon R. Beggs, Anaheim, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,610

(22) Filed: Apr. 9, 2013

(65) Prior Publication Data

US 2013/0225291 A1     Aug. 29, 2013

Related U.S. Application Data

(63) Continuation of application No. 12/565,566, filed on Sep. 23, 2009, now Pat. No. 8,425,289.

(51) Int. Cl.
*A63F 13/10* (2006.01)
*A63F 13/30* (2014.01)
*A63F 13/00* (2014.01)

(52) U.S. Cl.
CPC .................. *A63F 13/00* (2013.01); *A63F 13/12* (2013.01); *A63F 2300/8058* (2013.01); *A63F 2300/5573* (2013.01)
USPC .................................... 463/1; 463/42; 463/43

(58) Field of Classification Search
CPC ............ A63F 13/10; A63F 2300/5573; A63F 2300/8011
USPC ................................ 463/1, 42, 43
See application file for complete search history.

(56) References Cited

U.S. PATENT DOCUMENTS

| | | |
|---|---|---|
| 5,682,469 A | 10/1997 | Linnett et al. |
| 6,213,872 B1 | 4/2001 | Harada et al. |
| 6,535,907 B1 | 3/2003 | Hachiya et al. |
| 7,371,177 B2 | 5/2008 | Ellis et al. |
| 7,556,563 B2 | 7/2009 | Ellis et al. |
| 7,704,146 B2 | 4/2010 | Ellis |
| 2002/0022523 A1 | 2/2002 | Dan et al. |
| 2002/0028704 A1 | 3/2002 | Bloomfield et al. |
| 2002/0035405 A1 | 3/2002 | Yokoo et al. |
| 2002/0098879 A1 | 7/2002 | Rheey |
| 2005/0154594 A1 | 7/2005 | Beck |
| 2006/0211463 A1 | 9/2006 | Nishiyama et al. |
| 2007/0043687 A1 | 2/2007 | Bodart et al. |
| 2007/0218988 A1 | 9/2007 | Lucich |

(Continued)

OTHER PUBLICATIONS

Bandai.com—Tamagotchi: find Tamagotchi Music Star and other Tamagotchi Toys. Web page. Printed from the Internet <URL: http://www.tamagotchi.com/22 . Web retrieval date: Sep. 23, 2009.

(Continued)

*Primary Examiner* — Pierre E Elisca

(74) *Attorney, Agent, or Firm* — Pillsbury Winthrop Shaw Pittman LLP

(57) ABSTRACT

A traveling virtual pet game simulates a pet traveling between various geographic locations. As the pet travels, users interact with the virtual pet to aid the pet in acquiring traits associated with the geographic regions in which it travels and to observe traits that the pet has previously acquired.

18 Claims, 10 Drawing Sheets

(56) References Cited

U.S. PATENT DOCUMENTS

| | | | |
|---|---|---|---|
| 2007/0268299 | A1 | 11/2007 | Jung et al. |
| 2008/0081694 | A1 | 4/2008 | Hong et al. |
| 2008/0153596 | A1 | 6/2008 | Nguyen |
| 2008/0248809 | A1 | 10/2008 | Gower |
| 2009/0005140 | A1 | 1/2009 | Rose et al. |
| 2009/0053681 | A1 | 2/2009 | Shen et al. |
| 2009/0063282 | A1 | 3/2009 | Ganz |
| 2009/0117819 | A1 | 5/2009 | Nakamura |
| 2009/0118009 | A1 | 5/2009 | Ganz |
| 2009/0215433 | A1 | 8/2009 | Cavanaugh et al. |
| 2009/0240659 | A1 | 9/2009 | Ganz et al. |
| 2009/0307609 | A1 | 12/2009 | Ganz et al. |
| 2010/0153095 | A1 | 6/2010 | Yang et al. |
| 2013/0103760 | A1* | 4/2013 | Golding et al. ............... 709/204 |

OTHER PUBLICATIONS

Cube World—Stick people sticking together. Web page. Printed from the Internet <URL: http://www.radicagames.com/cubeworld/index.asp>. Web retrieval date: Sep. 23, 2009.

FooPets—Real Virtual Pets Online. Web page. Printed from the Internet: <URL: http://www.foopets.com/>. Web retrieval date: Sep. 23, 2009.

Pokemon.com—The Official Pokemon Website. Web page. Printed from the Internet: <URL: http://www.pokemon.com>. Web retrieval date: Sep. 23, 2009.

Pokemon Battle Revolution at Nintendo :: Games. Web page. Printed from the Internet: <URL: http://www.ninetendo.com/games/detail/1XtLHZS_0Kb_sJy4T9vuBgUfKUibop045>. Web retrieval date: Sep. 23, 2009.

Wizard 101 Online Multiplayer Game | Best Wizard Game. Web page. Printed from the Internet: <URL: http://www.wizard101.com/game>. Web retrieval date: Sep. 23, 2009.

Disney's Toontown: What is Toontown? Web page. Printed from the Internet: <URL: http://play.toontown.com/about.php>. Web retrieval date: Sep. 23, 2009.

Disney's Pirates of the Caribbean Online. Web page. Printed from the Internet: <URL: http://apps.pirates.go.com/pirates/v3/welcome>. Web retrieval date: Sep. 23, 2009.

Mii—Wikipedia, the free encyclopedia. Web page. Printed from the Internet: <URL: http://en.wikipedia.org/wiki/Mii>. Web retrieval date: Sep. 23, 2009.

* cited by examiner

| PET INFO DATABASE 56 | | | | | | |
|---|---|---|---|---|---|---|
| PET ATTRIBUTE INFO. | | | | | | |
| PET ID | OWNER ID | PHYS. ATTR. | TRAITS | SCORES | JOURNAL | |
| | | | ... | ... | ... | |
| | | | ... | ... | ... | |
| | | | ... | ... | ... | |

FIG. 5

TRAVELING VIRTUAL PET GAME SYSTEM

BACKGROUND

Many electronic games allow users ("players") to control simulated or "virtual" individuals or characters that are represented by graphical depictions on the screen of a computer, television or portable hand-held game device. Some electronic or computer games can be played on an ordinary home computer, while others are typically played on a dedicated game device. A game device may include, in addition to computer-like processors, memory, etc., a display screen and one or more buttons, joysticks or similar controls for user input. Some game devices have a form resembling a desktop computer or similar electronic equipment and can be connected to a television set to utilize the television screen as an output device. Portable hand-held game devices have built-in or integral displays, such as touch-screen displays. In some games, the characters have simulated strengths and weaknesses and can battle each other or perform other simulated tasks.

Remote data connectivity is a common feature in electronic gaming Some game systems can communicate with each other via the Internet, a wireless local-area network, or a wireless personal-area network. For example, in some instances a user can wirelessly transfer a character from the user's larger computer-like game device to the user's portable hand-held game device. Also, for example, via an Internet connection each of several players (users), who may be located anywhere in the world where Internet access is available, can have their characters battle or interact with each other in other ways. Players can also download characters or other elements used in a game from a Web site to their hand-held game devices, computers, etc.

Electronic toys or games that simulate the care or nurturing of a pet or other creature are known. Some games feature a keychain-fob-sized game device having a display screen on which a graphical representation of the pet is depicted. The device can, for example, indicate to the user that the pet is happy, hungry, sick, in need of exercise, etc. In response, the user can press buttons to represent the acts of feeding the pet, taking the pet outdoors for exercise, cleaning up the pet's waste, disciplining the pet for bad behavior, praising the pet for good behavior, etc. If the user presses appropriate buttons in response to corresponding conditions indicated on the display, the device responds by indicating to the user that the pet is happy and healthy. Similar "virtual pet games" can be played on-line, i.e., via Internet web sites, using a personal computer. Some web sites provide characters that users can download to their computers.

SUMMARY

Embodiments of the present invention relate to a system, method and computer program product for a traveling virtual pet game in which users simulate the pet traveling among various geographic locations. As the pet travels, users interact with the virtual or simulated pet to aid the pet in acquiring traits associated with the geographic regions in which it travels and to observe traits that the pet has previously acquired. A "trait," as the term is used herein, can broadly include any type of indication that a pet has been in the associated geographic region, including personal traits such as preferences, abilities, mannerisms, etc., as well as items or other things that a pet may acquire.

In exemplary embodiments of the invention, users can simulate interaction with the pet and its environment using game devices, such as portable hand-held units, computers, intelligent cell phones or similar communication devices, etc. The user-operated game devices can communicate data with each other or, in some embodiments, with a centralized coordinator system, via a data network that can include one or more of the Internet, a local-area network, a personal-area network, or any other wired or wireless connection through which two electronic devices can communicate information.

A game system, which can comprise the coordinator system, a user-operated game device, or a combination of both, can receive and process virtual pet information via the data network, where the received virtual pet information is associated with control of a virtual pet by a first one of the user-operated game devices. The game system can further process first geographic trait information associated with the pet. In some embodiments, the first geographic trait information can be included in the received virtual pet information. In other embodiments, the first geographic trait information can have been stored in the game system prior to receiving the virtual pet information. The first geographic trait information relates to a first geographic location associated with use of the first user-operated game device and includes information indicating a trait of the pet associated with the first geographic location. For example, the first geographic trait information can be included in or associated with virtual pet information received from a game device operated by a first user in a first country or other geographic region.

The game system can further process the virtual pet information that has been received or stored or is otherwise available for processing. This processing can include processing second geographic trait information associated with the pet. The second geographic trait information relates to a second geographic location associated with use of a second user-operated game device and includes information indicating a trait of the pet associated with the second geographic location. For example, the second geographic trait information can be included in or associated with virtual pet information received from a game device operated by a second user in a second country or other geographic region.

Through the above-described processing, the virtual pet successively acquires traits associated with two or more geographic regions. Following this processing, the game system transmits processed virtual pet information via the data network. For example, the game system can transmit processed virtual pet information to another game device or, alternatively, to a coordinator system.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE DRAWINGS

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

FIG. 5 illustrates an exemplary pet information database.

DETAILED DESCRIPTION

Figure 1:
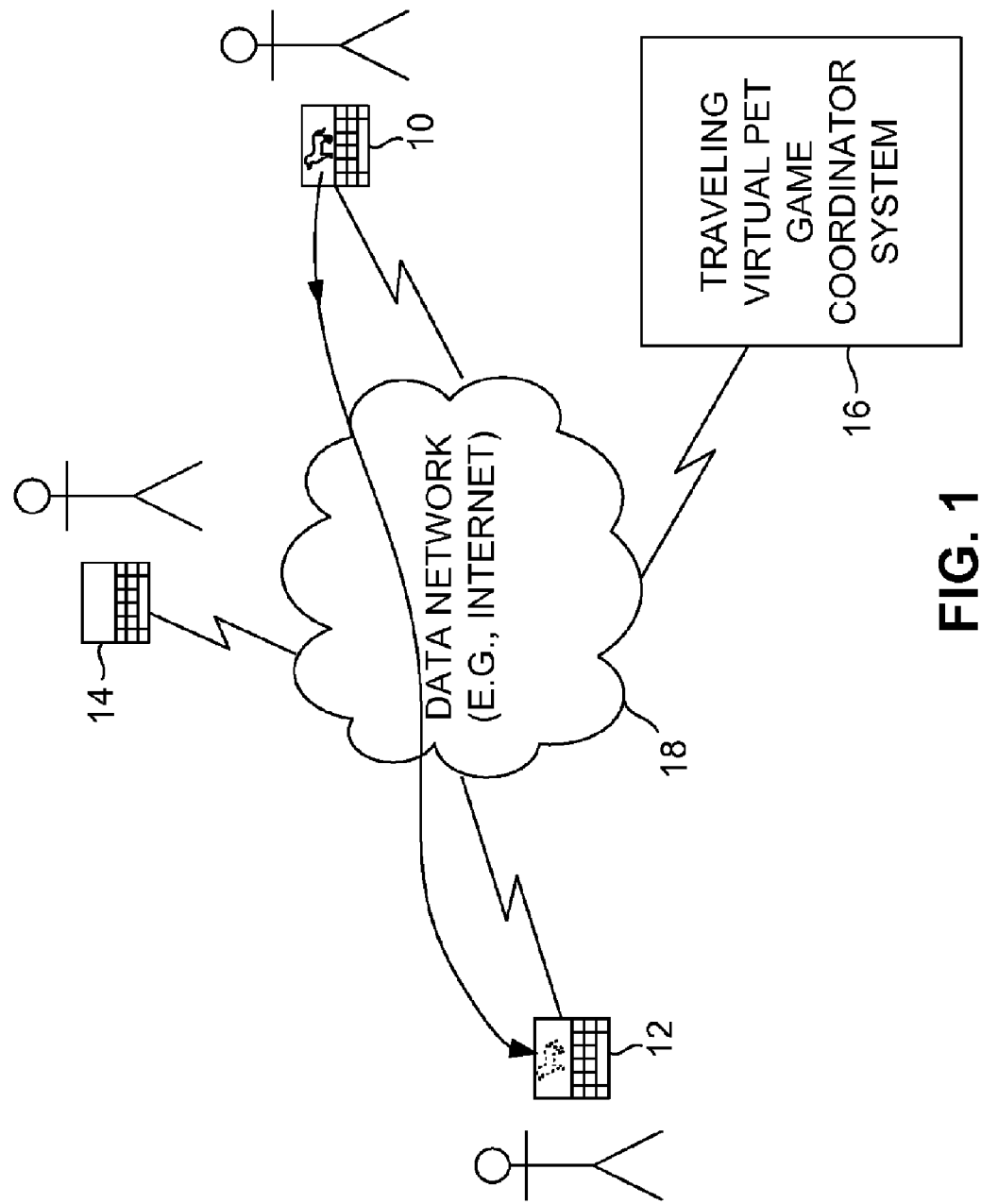
FIG. 1 illustrates game devices and centralized coordinator system capable of communicating with one another a via one or more data networks in a traveling virtual pet game system, in accordance with an exemplary embodiment of the invention.

As illustrated in FIG. 1, in an illustrative or exemplary embodiment of the invention, players can use game devices 10, 12, 14, etc., to play a traveling virtual pet game. Each of game devices 10, 12, 14, etc., can be operated or controlled by a user. As the game is intended to simulate having one's pet travel among various identifiable destinations throughout the world or an area thereof, users and their game devices can be located in various geographic regions or simulate being located in various geographic regions. There can be any number of such game devices, but only three exemplary game devices 10, 12 and 14 and the users who correspondingly control them are shown in FIG. 1 for purposes of clarity. Game devices 10, 12, 14, etc., can communicate with one another and with a coordinator system 16 via a data network 18.

For purposes of minimizing repetition, terms such as "simulated" and "virtual" may be omitted from descriptions herein, with the descriptions in some instances attributing acts or characteristics to "the pet" and things with which the pet interacts rather than to digital information, data structures, etc., actually representing such a pet or related things in the simulated or virtual (as opposed to actual) realm. For example: As the pet travels, the pet acquires traits associated with the geographic regions in which it travels, and the pet's current owner can observe traits that the pet has previously acquired while under the care of a previous owner. The term "geographic region" is intended to refer to any country, state, province, territory, desert, rainforest, or other region (including a fantasy region such as outer space, the depths of the sea, or a mythical country), with which the users of the game are likely to be able to identify cultural, natural or similar characteristics commonly associated with the region, such as dominant language, styles of dress, cuisines, historical or natural landmarks, unique terrain (e.g., desert, rainforest, etc.), or any other such characteristics.

Figure 2:
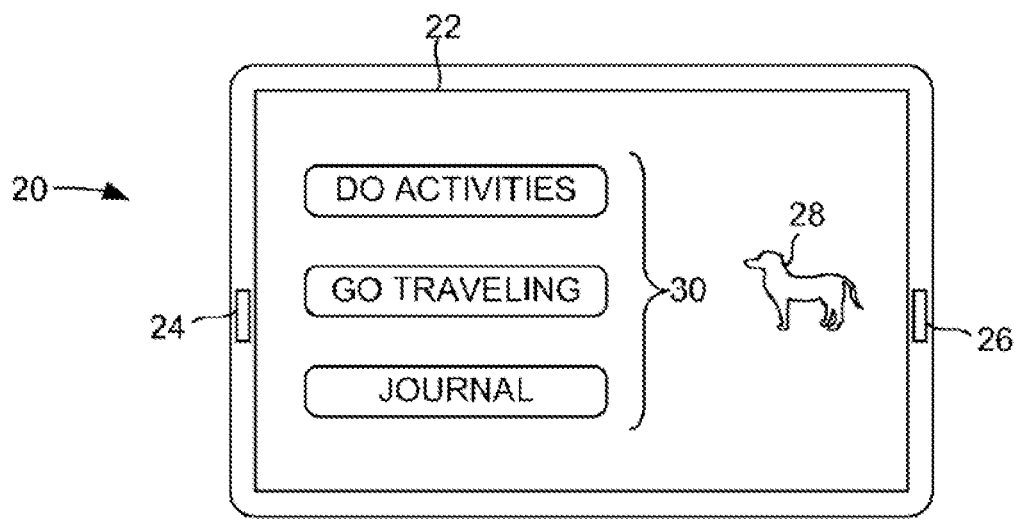
FIG. 2 is a top plan view of an exemplary one of the game devices of FIG. 1, showing an exemplary screen display.

Each of game devices 10, 12, 14, etc., can be any suitable type of device, such as the portable, hand-held game device 20 shown in FIG. 2. Alternatively, game devices 10, 12, 14, etc., can include larger devices, personal computers, computer-like cellular telephones (i.e., so-called "smart phones"), hybrids of such devices, and combinations of such devices (e.g., a combination of a computer coupled with a cellular telephone or other hand-held device). Although each of game devices 10, 12, 14, etc., can have any suitable type of user interface, including any suitable combinations of displays, buttons, and other input and output means, in the exemplary embodiment it (i.e., game device 20) has at least a touch-screen display 22, a speaker 24, and a microphone 26. Although in the exemplary embodiment game device 20 is shown as having generally rectangular or bar-like form, similar in shape and size to many conventional game devices, cellular telephones, portable music players and similar hand-held devices, in other embodiments the game devices can be of any suitable shape and size. Although not shown, a pocket-sized alternative game device having a shape and size resembling a keychain fob is also contemplated. However, a game device can have any suitable form.

Data network 18 can comprise any type of data communications infrastructure or system that allows one of game devices 10, 12, 14, etc., to communicate with another and with coordinator system 16. For example, data network 18 can represent any combination of one or more of the following or portions thereof: the global data network commonly referred to as the Internet, cellular telecommunications networks, public switched telephone systems, cable or fiber-based television and data service networks, local-area networks (LANs), and personal-area networks (PANs) such as that defined by the well-known BLUETOOTH® short-range wireless communication specification or other wireless specifications such as IEEE 802.11 and WIMAX. The term "network" as used herein is intended to refer only to the interconnectedness of the two or more devices and elements that can communicate with each other and is not intended to imply any specific physical infrastructure, topology, data communication mechanism or specification. Although not shown in FIG. 1 for purposes of clarity, one or more network service providers (e.g., an Internet service provider or ISP) can serve as intermediaries or interfaces between and among any of game devices 10, 12, 14, etc., and data network 18. Thus, for example, a user can establish a data communication link between one of game devices 10, 12, 14, etc. and coordinator system 16 by coupling the game device to a computer (e.g., using a Universal Serial Bus cable or similar wire-based interface, via a wireless PAN, etc.), which in turn can establish a data connection via data network 18.

The data communication connection between a game device 10, 12, 14, etc., and data network 18 can be made at any suitable time and is not in all instances permanent. For example, as described below, a user can connect one of game devices 10, 12, 14, etc., to data network 18 from time to time, as may be needed or desired in order to communicate data. However, at least some of the functions described herein can be performed by a game device 10, 12, 14, etc., operating in a stand-alone mode, i.e., not communicating data with another one of game devices 10, 12, 14, etc., or with coordinator system 16.

As indicated in FIG. 2, touch-screen display 22 of game device 20 can display a graphical representation 28 of the pet. Although the term "pet" is used herein for convenience of reference, the term "pet" is not limited to an animal Rather, the term "pet" broadly includes within its scope an imaginary friend or companion, a cartoon character or other character, a robot, a fanciful or mythological creature such as a dragon, dwarf, ghost, etc., or even no specific creature or being at all, i.e., it can simply represent some generalized being or entity and leave the pet's characteristics up to the user's imagination. Graphical representation 28 can resemble such a pet to any suitable extent, from a realistic rendering in some embodiments of the invention to an abstract or symbolic representation in others. Graphical representation 28 can be animated or still and can depict facial expressions or other indicators of the pet's happiness, hunger, or other state. Although not shown in FIG. 2, a background can be displayed along with representation 28. The background can be associated with the pet's geographic location. Such backgrounds can include famous landmarks that are commonly associated with various geographic locations. For example, a pet in Paris can be depicted against a background of the Eiffel Tower. In addition to or instead of graphical representation 28, touch-screen display 22 can display a textual indication of the pet's state (e.g., "I am hungry") as well as other information in textual form.

Touch-screen display 22 can display one or more buttons 30, i.e., graphical representations that a user can touch to provide user input. Buttons 30 can have textual labels or be in the form of icons to prompt the user or to otherwise convey the function or option that the buttons represent. Examples of user input that a user can provide via buttons 30 include commands indicating that the user would like to have the pet participate in activities or go traveling, or indicating that the user would like to read or edit journal entries relating to the pet. As described below, a feature that can be included relates to maintaining a journal describing the pet's travels. As also described below, as with other virtual pet information the journal can be maintained within game device 20 (i.e., stored in memory) or, alternatively or in addition, maintained within coordinator system 16 or other data storage system external to game device 20. The buttons 30 shown in FIG. 2 are intended only to be exemplary or illustrative, and in other embodiments the game device user interface can provide more buttons, fewer buttons, or different buttons than those shown in FIG. 2 in connection with the exemplary embodiment.

Figure 3:
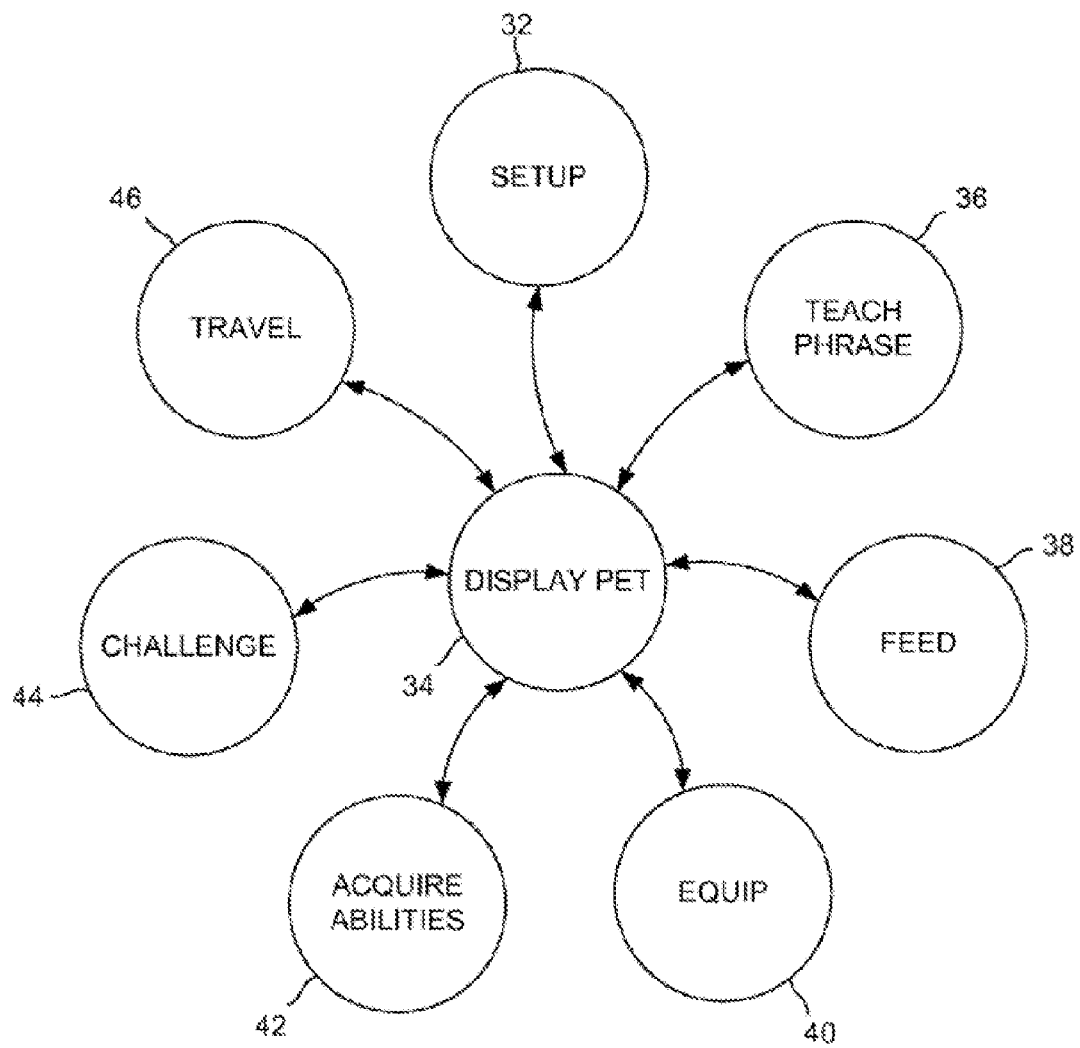
FIG. 3 illustrates exemplary states or modes representing functions that can be performed using the game device of FIG. 2.

As illustrated in FIG. 3, when user initializes game device 20 (e.g., turns its power on, resets it, etc.), game device 20 can begin operating in a setup mode or state 32. Information that represents the virtual pet or anything relating to the pet or its virtual realm, broadly referred to herein as virtual pet information (VPI), can be stored in game device 20, coordinator system 16, or a combination thereof. For example, in the setup mode the user can be prompted via touch-screen display 22 to select a pet or pet type from among a menu of pets or pet types (not shown), where such information is pre-stored in game device 20. However, if a data communication link between game device 20 and coordinator system 16 exists, the user can access a larger menu of pets or pet types in coordinator system 16.

The user similarly can be prompted to select the user's geographic location from among a menu of geographic locations (not shown). In instances in which the user is using a computer (not shown) to log in to coordinator system 16 instead of game device 20, coordinator system 16 can prompt the user to select the user's geographic location at the time of login. In some embodiments game device 20 or coordinator system 16 may be capable of automatically, i.e., without user input, determining the country, city, etc., in which game device 20 or the user is located (e.g., using the output of a Global Positioning System receiver (not shown) in the game device, deducing geographic location from an Internet Protocol address or telephone number, etc.). Regardless of how the geographic location of the user or the user's game device 20 is selected, it is this geographic location to which the descriptions herein refer as representing the user' pet's location.

The user can also similarly be prompted to select environments or items with which the pet can interact. For example, in some embodiments the user can select a jungle, forest, doghouse, space setting, etc. Alternatively, game device 20 or coordinator system 16 can select an environment randomly or in response to certain conditions. The selected environment can be displayed on touch-screen display as the above-referenced background. In some embodiments a user can similarly select a pet's belongings, tools, weapons, clothing, etc. Although not shown for purposes of clarity, game device 20 can cause selected items to be depicted on touch-screen display 22.

In addition to the above-described types of VPI, game device 20, coordinator system 16, or game device 20 and coordinator system 16 together in combination, can randomly generate VPI representing physical attributes of the pet (including mental attributes), such as the pet's intelligence, dexterity, strength, temperament, etc. In embodiments in which the user does not select a pet having a specific appearance but rather only broadly selects a type of pet or does not make any such selection at all, physical attributes representing the pet's appearance, size, etc., can also be randomly generated for the user. A name or other identifier for the pet can be selected by the user or generated for the user. All such VPI is stored in a suitable manner, as described in further detail below.

After setup is completed, game device 20 can enter a mode or state 34 in which it displays graphical representation 28 of the pet or otherwise outputs a screen display along the lines of that described above with regard to FIG. 2. As described above, the screen display can also depict an environment and items relating to the pet. As described above with regard to FIG. 2, such a screen display can provide a menu of options from which the user can choose (e.g., by touching a corresponding one of buttons 30). In the exemplary embodiment, except as may be stated otherwise herein, state 34 is a default mode, to which game device 20 reverts after exiting the other states described herein. Accordingly, the arrows in FIG. 3 indicate a transition between state 34 and all such other states. However, game device 20 can transition between other states. For example, although not shown for purposes of clarity, the user interface of game device 20 can provide hierarchical menus, where a menu of sub-states or sub-menus can be reached by selecting corresponding menu items (e.g., via additional buttons 30). In FIG. 3, for purposes of clarity all other states are shown as being equally reachable from state 34, i.e., by means of a flat, non-hierarchical menu. Persons skilled in the art to which the invention relates can appreciate that there are many other suitable menu structures or other user interface features that can be included in various embodiments.

Some of the exemplary modes or states shown in FIG. 3 relate to activities in which the user can have the pet participate. A user interface sub-menu listing such states (not shown) can be reached by, for example, pressing a "Do Activities" button 30.

An example of an activity is represented by state 36, in which a user can attempt to teach the pet a word or phrase via game device 20. Game device 20, coordinator system 16, or a combination of both can include teaching logic (not shown in FIGS. 1-3) that causes touch-screen display 22 to display a list or menu of phrases from which the user can select. The phrases are in a language that is dominant in or otherwise widely associated with the geographic location of game device 20. In response to the user selecting a phrase, the teaching logic can randomly determine whether the pet has learned the phrase. For example, if a randomly generated number exceeds a threshold based upon the pet's intelligence, the pet is deemed to have learned the phrase. If the pet has not learned the phrase, game device 20 can cause speaker 24 to output in audible or spoken form an improperly spoken phrase. The user can then re-select the phrase and repeat the process. If the pet has learned the phrase, then game device 20 can cause speaker 24 to output the properly spoken phrase. The learned phrase or indication that the phrase was learned is stored as part of the VPI in game device 20 or, alternatively or in addition, in coordinator system 16.

Alternatively to randomly determining whether the pet has learned a phrase, a speech recognition feature can be included in some embodiments. In such an embodiment, a user can speak the selected phrase, which microphone 26 (FIG. 2) receives and which speech-recognition logic (not separately shown) then attempts to recognize. If the phrase is recognized, game device 20 can cause speaker 24 to output the phrase in audible or spoken form. If the phrase is not recognized, game device 20 can cause speaker 24 to output an improperly spoken phrase. If the pet is deemed to have learned the phrase, then game device 20 can cause speaker 24 to output the properly spoken phrase. In some embodiments, some randomization of the type described above can be included so that even if the spoken phrase is recognized, the pet may not be deemed to have learned the phrase, and the user may need to repeat the phrase several times before the pet learns it. The inclusion of such randomization helps simulate the process of learning. The learned phrase or indication that the phrase was learned is stored as part of the VPI in game device 20 or, alternatively or in addition, in coordinator system 16.

The learned phrase becomes one of the pet's traits. As described below, when the pet travels to another geographic location, the pet brings its traits, including phrases that the pet has learned. The pet can speak the "foreign language" phrases to entertain its new owner in a new geographic region in which a different language is spoken. For example, a pet that travels to America from France may say "bonjour" to its American owner. Although in the exemplary embodiment the phrase is spoken, i.e., emitted via speaker 24, in other embodiments the phrase can be issued by displaying it in text format on the display screen.

Another example of an activity in which the pet can participate is represented by state 38, in which a user can feed the pet via game device 20. Game device 20, coordinator system 16, or a combination of both can include feeding logic (not separately shown) that causes touch-screen display 22 to display an indication of whether the pet is hungry. If the user provides input indicating a desire to feed the pet, the feeding logic can cause touch-screen display 22 to display a list or menu of food items from which the user can select. The user can feed the pet by selecting a food item. The food items in the list can include foods that are widely associated with the geographic location of game device 20. In response to the user selecting a food item, the teaching logic can randomly determine whether the pet's hunger is satisfied, whether the pet enjoyed the food item, and other results. For example, if a randomly generated number exceeds a threshold based upon the pet's temperament, the pet is deemed to have enjoyed the food item. An indication of an enjoyed food item is stored as part of the VPI in game device 20 or, alternatively or in addition, in coordinator system 16.

The enjoyed food item becomes one of the pet's traits. As described below, when the pet travels to another geographic location, the pet can bring with it a taste for food items that are commonly associated with a pet's previous geographic location. For example, a pet that travels to France from Japan may request a meal of sushi from its new French owner because the pet's previous Japanese owner chose to feed it sushi.

Another example of an activity in which the pet can participate is represented by state 40, in which a user can equip the pet with clothing, accessories, tools, souvenirs, etc. Game device 20, coordinator system 16, or a combination of both can include equipping logic (not separately shown) that causes touch-screen display 22 to display a list or menu of items from which the user can select. The items can include those that are widely associated with the geographic location of game device 20. In response to the user selecting an item, the equipping logic can cause an indication of the item to be stored as part of the VPI in game device 20 or, alternatively or in addition, in coordinator system 16.

Although the user actively equipping the pet with items is contemplated, alternatively or in addition the pet can acquire items at random times, i.e., not as a result of any user input, such as by simulating a surprise gift from another person or character, or receiving a gift by "magic" (i.e., from no donor in particular). The gifted items can similarly be of types that are widely associated with the geographic location of game device 20.

Items that the pet acquires can become additional pet traits. For example, a pet that travels to Japan from Hawaii may arrive at its new Japanese owner wearing a lei because the pet's previous Hawaiian owner chose to give it a lei.

Another example of an activity in which the pet can participate is represented by state 42, in which a user can train the pet or the pet can otherwise acquire abilities. Game device 20, coordinator system 16, or a combination of both can include training or ability logic (not separately shown) that causes touch-screen display 22 to display a list of abilities from which the user can select. The abilities can include those that are widely associated with the geographic location of game device 20, such as flamenco dancing in Spain. Alternatively or in addition, the pet can acquire abilities at random, i.e., not as a result of any user input. The ability logic can cause an indication of the item to be stored as part of the VPI in game device 20 or, alternatively or in addition, in coordinator system 16.

Another example of an activity in which the pet can participate is represented by state 44, in which a user can enter the pet into contests or challenges. Game device 20, coordinator system 16, or a combination of both can include challenge logic (not separately shown) that causes touch-screen display 22 to display a list of challenges from which the user can select. The challenges can include those within venues that are widely associated with the geographic location of game device 20, such as the Coliseum in Rome, a famous racetrack, distinctive mountainous or desert terrain, etc. However, fantasy locations can also be included, such as battling space aliens in an extraterrestrial setting or placing the pet within a popular cartoon or video game setting to interact with the cartoon's or video game's familiar characters. The challenge logic can simulate the pet competing against another pet, a character, itself, etc. In performing the challenge or competition, the pet can use the above-referenced tools (e.g., weapons, protective clothing, etc.) and abilities (e.g., fighting techniques) that the pet may have acquired. The competition or challenge can be conducted in a manner similar to that of a conventional electronic game or "video game," where simulated action is provided via screen displays, the outcome is dependent upon the strengths and weaknesses of the participants (e.g., intelligence, dexterity, strength, etc.), and the participants score points. As persons skilled in the art to which the invention relates understand how to provide such electronic games and the "virtual worlds" with which the games' characters interact, this feature is not described in further detail herein. The challenge logic can cause the score to be stored as part of the VPI in game device 20 or, alternatively or in addition, in coordinator system 16.

Another exemplary mode or state 46 relates to pet travel. While a user can exercise control over a pet for a time by having the pet participate in one or more activities such as those described above, the user may decide at some point to send the pet traveling. Sending the pet traveling means that the pet is no longer under that user's control and becomes available for another user to exercise control over. A user interface sub-menu listing travel options (not shown) can be reached by, for example, pressing a "Go Traveling" button 30 (FIG. 2). Travel logic (not separately shown) in game device 20, coordinator system 16, or a combination of both can respond to such user input by causing touch-screen display 22 to display a map (not shown) or other listing of the regions in which the pet can travel. For example, in an embodiment of the invention in which pets travel among the countries of the globe, the map can be a global map depicting all the countries or other geographic regions on Earth or only some portion thereof. In an embodiment of the invention in which the pets travel among, for example, regions of outer space, the map can be a map depicting galaxies, planetary systems or other regions. Map data can be transferred or downloaded from coordinator system 16 to game device 20 or other source on an as-needed basis. The map can further include icons (e.g., resembling map pins) to indicate the locations of pets whose owners (i.e., users) would like to send them traveling.

In response to a first user selecting a pet (e.g., by touching a pin icon on touch-screen display 22), the travel logic can process the VPI as described in further detail below to indicate a transfer of control of the second user's pet from the second user to the first user. For purposes of associating owners with their pets, users can be identified by login credentials that are entered into game device 20 during the setup mode described above or at other times. Alternatively, instead of users being associated with their pets, the users' game devices 20 can be associated with the pets, where the game devices 20 are identified by unique serial number-like identifiers. Similarly, the travel logic can process the VPI to indicate a transfer of control of the first user's pet from the first user to the second user. Thus, in effect, two users who indicate that they would like to send their pets traveling can trade or exchange pets. Furthermore, in some embodiments the trading or exchanging of pets between two users can be initiated when the users' game devices 20 are brought into close proximity with each other. In such an embodiment, a wireless data communication link can be established between the two game devices 20, and the relevant VPI exchanged via the communication link to effect the trade in response to the users indicating their assent to the trade. Game device 20 can indicate the occurrence of a pet exchange or otherwise indicate a pet traveling by altering representation 28 (FIG. 2). For example, representation 28 can include an animation depicting the pet waving goodbye and then disappearing from the screen.

Alternatively or in addition, the travel logic can cause a pet to travel in response to conditions other than a user indicating a desire to send a pet traveling. For example, if VPI relevant to the pet's then-current state indicates that that a pet is not being properly cared for, the travel logic can return the pet to a previous owner. Whether a pet is being properly cared for can be determined in various ways that will occur readily to persons skilled in the art in view of these teachings. For example, the VPI can include scores representing happiness, hunger, health, etc. These scores can be maintained and updated in response to the outcomes of activities such as feeding the pet, training the pet, etc. Periodically, a total of the scores can be compared with a threshold. If the total does not exceed the threshold, the pet is deemed not to have been sufficiently cared for and is returned to a previous owner.

Figure 4:
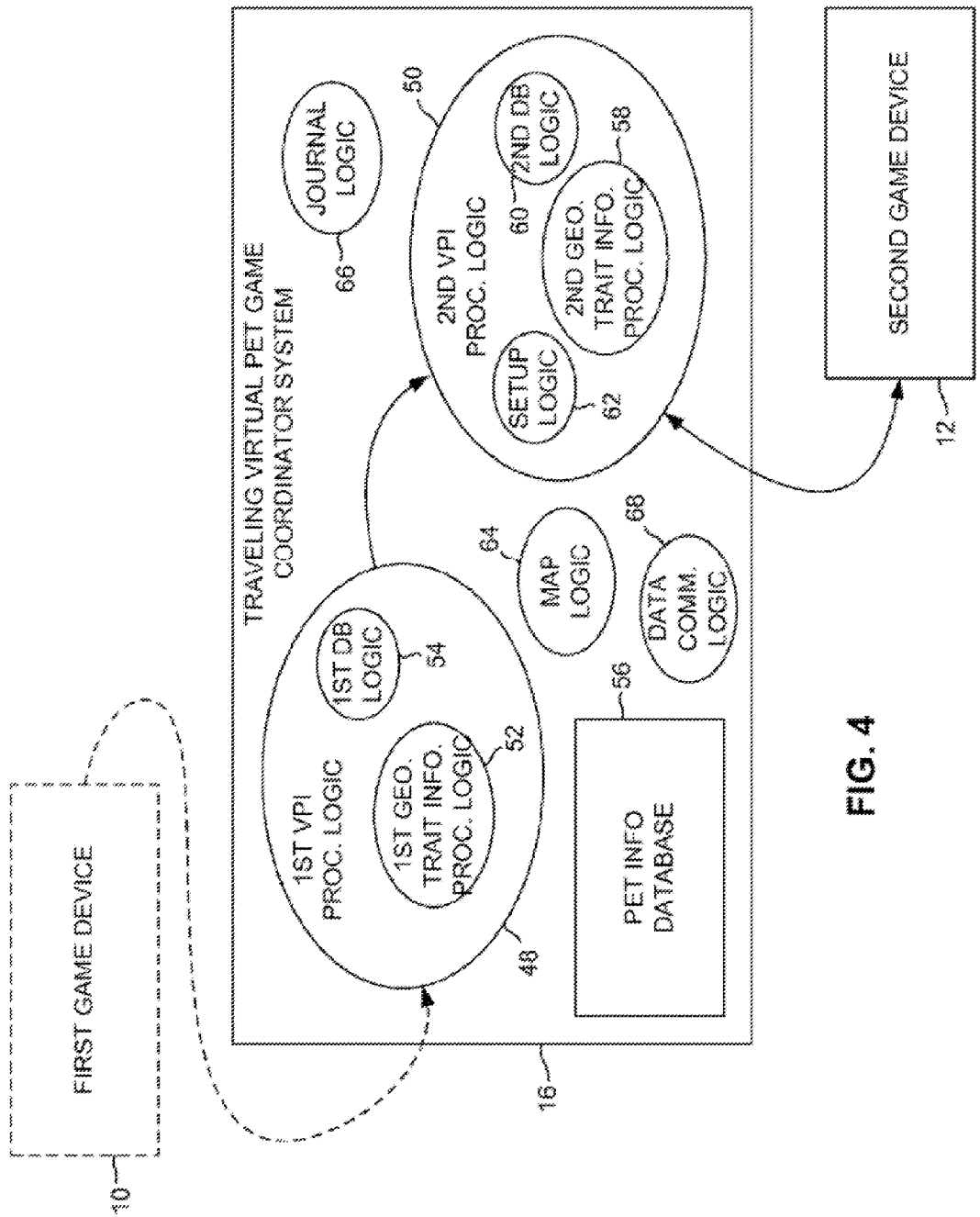
FIG. 4 is a block diagram showing logical connections among a first game device, centralized coordinator system, and a second game device, in accordance with the exemplary embodiment.

The logic that governs the operation of the traveling virtual pet game, including the above-described teaching logic, feeding logic, equipping logic, ability logic, challenge logic, and travel logic, can be included in coordinator system 16 in some embodiments of the invention, in game device 20 in other embodiments, and distributed between coordinator system 16 and game device 20 (or similar systems or devices) in still other embodiments. For example, as illustrated in FIG. 4, coordinator system 16 can include first VPI processing logic 48 and second VPI processing logic 50 for processing VPI relating to a pet. First VPI processing logic 48 processes first VPI that has been associated with control of a pet by a first (user's) game device, such as game device 10. "Control" of a pet refers to the user caring for the pet, causing the pet to participate in activities, initiate travel, etc., in the manner described above, and indicating the results of such activities or travel to the user. Thus, for example, at some time while or after a first user uses first game device 10 to cause the first user's pet to participate in an activity or initiate travel, first game device 10 transmits first VPI relating to the activity or initiation of travel to coordinator system 16, which uses first VPI processing logic 48 to process the received first VPI. This first VPI can include any type or amount of information associated with the control of the pet by the first user. For example, the first VPI can include information describing pet attributes acquired while the pet is under the first user's or first game device's control, such as the pet's name or other identifier, the pet's owner (e.g., user login credentials or game device identifier), trait information describing the pet's geographic, physical or other traits, etc. Both first VPI processing logic 48 and similar logic (not shown) in first game device 10 can participate in this processing. For example, in some embodiments the bulk of the processing relating to a pet participating in an activity can be performed by logic (not shown in FIG. 4) in first game device 10, and the VPI that coordinator system 16 receives mostly comprises the results of the activity. Alternatively, in other embodiments first game device 10 may perform relatively little processing relating to a pet participating in an activity, and the first VPI can consist of as little as a single command or other signal to perform processing, in response to which first VPI processing logic 48 of coordinator system 16 performs the bulk of the processing relating to a pet participating in an activity under control of the first user or first game device 10.

First VPI processing logic 48 can include first geographic trait processing logic 52 for processing first geographic trait information associated with the pet, where the first geographic trait information relates to traits of a pet associated with a first geographic location, and where the first geographic location is associated with control of a pet by the first (user's) game device 10. For example, if it is indicated that the first user or the user's game device 10 is located in a first country, the first geographic trait information relates to traits of the pet acquired while the pet is under control of that user or game device 10. As described above, such traits are those that are commonly associated with that first country, such as food and clothing styles and preferences, items, abilities, etc., that the pet may have acquired. Although not shown in FIG. 4 for purposes of clarity, first geographic trait processing logic 52 can include some or all of the above-described logic relating to activities in which the pet can acquire geographically-related traits, such as the teaching logic, feeding logic, equipping logic, ability logic, etc. First VPI processing logic 48 can further include first database logic 54 for storing the VPI in a pet information database 56 and retrieving the VPI from pet information database 56. Note that "processing" VPI can include storing and retrieving VPI in this manner as well as manipulating or changing items of VPI before or after storage in pet information database 56.

Second VPI processing logic 50 processes second VPI that is associated with control of a pet by a second (user's) game device, such as game device 12. Thus, for example, at some time while or after a second user uses second game device 12 to cause the pet (then, having effectively "traveled," under control of the second user or the second user's game device 12) to participate in an activity or travel, coordinator system 16 transmits second VPI relating to the activity or travel to second game device 12. This second VPI can include any type or amount of information associated with the control of the pet by the second user or second user's game device 12. For example, the second VPI can include information describing pet attributes acquired while the pet is under the second user or game device's control or indicators of whether the pet is happy, healthy, hungry, etc. Both second VPI processing logic 50 and similar logic (not shown) in second game device 12 can participate in this processing. For example, in some embodiments, the bulk of the processing relating to the pet participating in an activity under control of the second user or second user's game device 12 can be performed by second VPI processing logic 50, and the VPI that second game device 12 receives mostly comprises the results of the activity or travel. Alternatively, in other embodiments second game device 12 may perform the bulk of the processing relating to a pet participating in an activity, and the second VPI that coordinator system 16 transmits to second game device 12 can consist of as little as a single command or other signal to perform processing. As described in further detail below, while in the exemplary embodiment coordinator system 16 performs substantial processing, in other embodiments a coordinator system can act as little more than a conduit, receiving VPI from a first game device and re-transmitting it to a second game device without the coordinator system performing substantial processing. In such embodiments the game devices themselves perform the bulk of the processing of the first and second VPI.

Second VPI processing logic 50 can include second geographic trait processing logic 58 for processing second geographic trait information associated with the pet, where the second geographic trait information relates to traits of a pet associated with a second geographic location, and where the second geographic location is associated with control of a pet by the second (user's) game device 12. For example, if it is indicated that the second user or the user's game device 12 is located in a certain country, the second geographic trait information relates to traits of the pet acquired while the pet is under control of the second user or game device 12. Although not shown in FIG. 4 for purposes of clarity, second geographic trait processing logic 52 can include some or all of the above-described logic relating to activities in which the pet can acquire geographically-related traits, such as the teaching logic, feeding logic, equipping logic, ability logic, etc. Second VPI processing logic 50 can further include second database logic 60 for storing the VPI in pet information database 56 and retrieving the VPI from pet information database 56. Second VPI processing logic 50 can also include the setup logic 62 that controls the above-referenced setup mode or state 32 (FIG. 3).

It should be noted that the terms "first" and "second" as used herein with reference to processing logic, game devices, etc., are not intended to imply any order or sequence, but rather are used only for convenience of reference to distinguish one from another. However, first game device 10 is shown in broken line in FIG. 4 to emphasize that it need not be in communication with coordinator system 16 while second game device 12 is in communication with coordinator system 16. Also, except where it may be specifically stated otherwise, any actions or steps described herein can occur at any suitable time and in any suitable sequence.

Note that although an arrow in FIG. 4 represents a logical connection between first game device 10 and first VPI processing logic 48, and another arrow represents a similar logical connection between second game device 12 and second VPI processing logic 50, the arrows do not represent physical connections (though corresponding physical connections or data paths through network 18 may exist at times). For example, although a logical connection is shown between second game device 12 and second VPI processing logic 50, this logical connection may only exist for finite durations, and at other times another logical connection (not shown in FIG. 4) may exist that could be represented by a line or arrow between first game device 10 and second VPI processing logic 50. Likewise, at other times still another logical connection (not shown in FIG. 4) may exist that could be represented by an arrow between second game device 12 and first VPI processing logic 50.

With reference to FIG. 1, any of game devices 10, 12, 14, etc., can control the pet at various times and, accordingly, establish both a logical connection between that game device and second VPI processing logic 50 and a corresponding physical connection or path through data network 18. In contrast, when a user or the user's game device has relinquished control of a pet (e.g., the owner has sent the pet traveling), and there is no longer a physical connection or path through data network 18 (as indicated by the broken-line arrow between first game device 10 and first VPI processing logic 48 in FIG. 4), all that remains is a logical connection between first VPI processing logic 48 and the game device or devices that no longer control the pet. The first VPI that first VPI processing logic 48 processes as a result of this logical connection may, at the time of processing, have been stored in pet information database 56, for example, and first VPI processing logic 48 processes such first VPI by, for example, retrieving it from pet information database 56 and providing it to second VPI processing logic 50. As described above, the first VPI that first VPI processing logic 48 processes is associated with the control of the pet by the first user or first (user's) game device 10, and the logical connection with first game device 10 reflects that association. However, in some instances, there may no longer be a physical connection or data path between first game device 10 and coordinator system 16 at the time such processing occurs in coordinator system 16. As noted above, this first VPI can include pet attribute information, trait information describing the pet's geographic, physical or other traits, etc., or any other VPI acquired while the pet was under the first user's control. Also, some or all of the above-referenced second VPI can be the result of first VPI processing logic 48 processing the first VPI.

In addition to the logic elements described above, coordinator system 16 can include map logic 64 and journal logic 66 to control the above-referenced features in which a map is used as part of a user interface scheme for pet travel, and a journal is provided to record aspects of the pet's experiences and history. Data communication logic 68 can also be included to control the communication of VPI and other data between the logic of coordinator system 16 and game devices via data network 18.

As illustrated in FIG. 5, pet information database 56 contains VPI. The VPI can include pet attribute information, such as information identifying a pet (e.g., a name, identification number, etc.), information identifying present and previous owners of the pet (e.g., an owner identification number), and information identifying physical attributes of the pet (e.g., the pet's appearance, intelligence, dexterity, strength, temperament, etc.). The VPI stored in pet information database 56 can further contain information identifying the pet's geographically-related traits, such as food preferences, abilities, equipment, etc. The VPI stored in pet information database 56 can also contain information identifying scores representing a pet's happiness, health, etc., as described above, or scores achieved as a result of participating in challenges. The VPI stored in pet information database 56 can still further include the above-described journal, representing a log of the pet's travels, challenges, and other experiences and their results. Also, although not shown for purposes of clarity, the above-referenced map can be stored in pet information database 56. Although shown as a table in FIG. 5 for purposes of illustration, pet information database 56 can have any suitable structure and include any of the above-described VPI for any number of pets. For example, although referred to as a "database," pet information database 56 need not be a relational database. Note that although any number of pets can be included in the systems and methods described herein, for purpose of clarity the examples set forth herein involve only a single pet or, in the case of trading or exchanging pets, two pets.

Figure 6A:
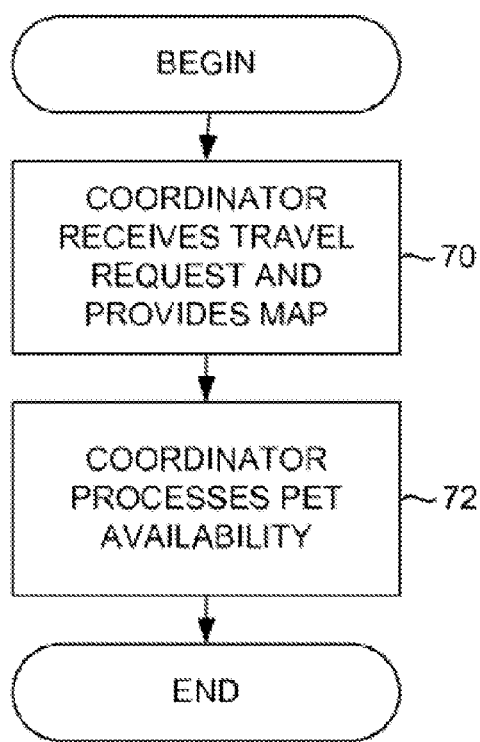
FIG. 6A is a flow diagram showing an exemplary method of operation of a traveling virtual pet game system.
Figure 6B:
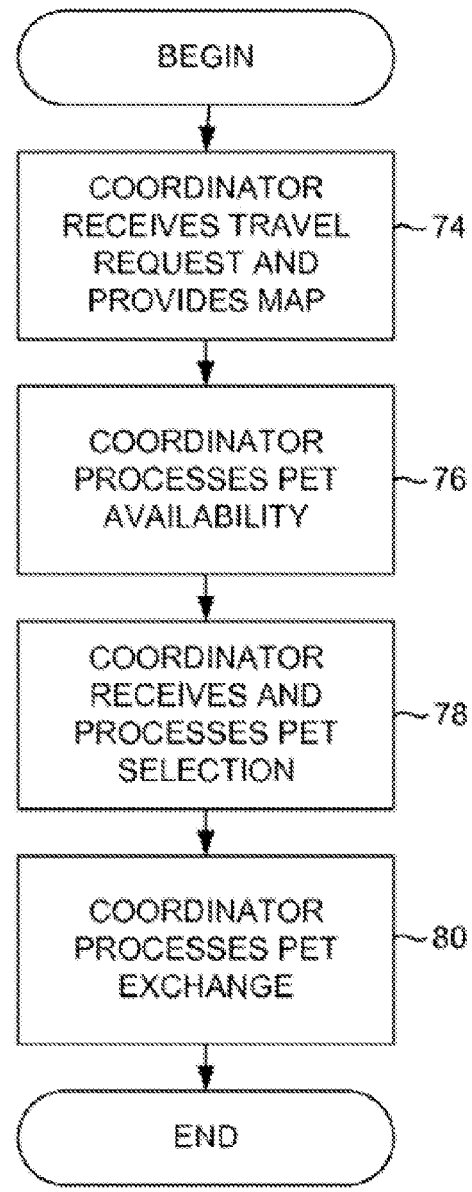
FIG. 6B is a flow diagram showing another exemplary method of operation of a traveling virtual pet game system.

The above-described logic elements and logical connections can be further understood with reference to the following example, illustrated in FIGS. 6A-B, representing operation of the travel feature. More specifically, the example represents two users trading or exchanging pets. Operation of the travel feature begins in response to one of the conditions described above, such as a user actuating a button on the user's game device, indicating a desire to send the pet traveling or make the pet available for "adoption" by another user. Note that initially, i.e., prior to sending the pet traveling, the pet has participated in activities or otherwise acquired pet attribute information, geographically-related traits, scores, a journal, etc., associated with control of the pet by the user, i.e., acquired while under the control of the user or user's game device. By sending the pet traveling, the user (at least temporarily) relinquishes control of the pet. In some embodiments, the pet can return to the user at a later point in time.

As indicated by block 70 (and with reference again to FIG. 4), coordinator system 16 provides first game device 10 with the above-referenced map. This operation can involve the user's first game device 10 transmitting a command or request to coordinator system 16. In response to receiving this request, first VPI processing logic 48 (i.e., first database logic 54) and map logic 64 of coordinator system 16 retrieve the map information from pet information database 56 and transmit the relevant information to first game device 10, which then displays the map for the user. The screen display may include indications, such as icons resembling push-pins, of pets available for travel or "adoption."

As indicated by block 72, first VPI logic 48 of coordinator system 16 receives and stores an indication that the first user's pet is available for travel. Also, if not already stored in pet information database 56 (e.g., first game device 10 has not been in communication with coordinator system 16 in some time), the current or present geographic location of the pet is stored, along with any other VPI of the types described above that can be stored in pet information database but have not yet been stored, such as pet attribute information.

Once the first user has indicated a desire to send the pet traveling in the manner described above with regard to blocks 70 and 72, the user can adopt another pet, perform other actions, or simply do nothing more at that time. The present example continues with regard to FIG. 6B to represent an instance in which a second user indicates a desire to adopt the pet same pet described above with regard to blocks 70 and 72 in FIG. 6A. However, it should be understood that any of the operations represented by any of the blocks described herein can be performed in any other suitable combination or order, and with respect to any user. In the present example, a second user uses second game device 12 (FIG. 4) to initiate travel. For example, the second user can press a button on second game device 12 in the same manner described above with regard to first game device 10. Accordingly, the operation can involve second game device 12 transmitting a command or request to coordinator system 16.

As indicated by block 74, coordinator system 16 responds to the request by providing second game device 12 with the above-referenced map. Block 74 can represent essentially the same operation as above-described block 70. Second VPI processing logic 50 (i.e., second database logic 60) and map logic 64 of coordinator system 16 can retrieve the map information from pet information database 56 and transmit information to second game device 12, which then displays the map for the user. As described above, the screen display may include indications, such as icons resembling push-pins, of pets available for adoption.

As indicated by block 76, second VPI logic 50 of coordinator system 16 receives and stores an indication that the second user's pet is available for adoption. Also, if the then-current geographic location of the second user's pet is not already stored stored in pet information database 56 (if, for example, second game device 12 has not been in communication with coordinator system 16 in some time), it is then stored, along with any other VPI of the types described above that can be stored in pet information database but have not yet been stored, such as pet attribute information. Block 76 can represent essentially the same operation as above-described block 70.

Once the second user has indicated a desire to make the second user's pet available for adoption, the second user can adopt another pet, perform other actions, or simply do nothing more at that time. As noted above, the present example represents an instance in which the second user indicates a desire to adopt the pet that was previously made available for adoption by the first user. It should be noted that although the examples described herein relate to a single pet (or two pets in the case of trading pets) for illustrative purposes, nothing stated herein precludes a user from controlling more than one pet at a time in some embodiments of the invention.

The second user can then select an available pet indicated on the map, representing a pet that the user would like to adopt. As indicated by block 78, coordinator system 16 receives and processes an indication of user's selection. Second VPI processing logic 50 (i.e., second database logic 54) of coordinator system 16 searches pet information database 56 to locate the VPI relating to the selected pet. As indicated by block 80, second VPI processing logic 50 then modifies information in pet information database 56 to indicate that the pet that was previously under the control of the first user or first game device 10 is now under control of the second user or second game device 12, and that the pet that was previously under the control of the second user or second game device 12 is now under control of the first user or first game device 10. The result of the above-described operations in this example is that the first and second users effectively trade or exchange pets with each other. It should be noted that any user can adopt any pet available for adoption, i.e., any pet that was previously under the control of any other user or game device. For example, with reference to FIG. 1: a user of first game device 10 can adopt a pet previously under the control of a user of second game device 12; the user of second game device 12 can adopt a pet previously under the control of a user of a third game device 14, the user third game device 14 can adopt a pet previously under the control of the user of first game device 10; etc.

Following a trade, a pet's new owner (i.e., a user) can observe manifestations of geographically-related traits that the pet acquired while under control of a previous owner. For example, the pet can wear clothing, exhibit abilities, or speak a phrase in a language associated with a geographic location of the pet's previous owner. Following a trade, each user involved in the trade can have the user's new pet participate in activities and thus acquire new traits associated with the new user's geographic location. The user can review the pet's journal by, for example, pressing a button on the user's game device, in response to which coordinator system 16 (i.e., journal logic 66) retrieves the pet's journal and transmits it to the requesting game device for display. The new user can see in the pet's journal any challenges or other activities in which the pet participated, and the results, such as whether the pet won the challenge, enjoyed the activity, etc. The journal can also include graphics or photographs of landmarks or places associated with the geographic regions in which the pet has traveled, in a manner analogous to a collection of souvenir postcards. A pet's image can be superimposed on such a photograph. The journal can also indicate the pet's state in general terms, such as whether a pet is happy. As noted above, in some embodiments a user's unhappy pet can be placed for adoption or traded with another pet automatically, i.e., without user input. As also noted above, in some embodiments a pet can return to a previous owner.

Although a user may wish to access a pet's journal as soon as the user adopts the pet, a user can access the journal in the above-described manner at any time. In addition, users can access the journals of pets they have previously owned by establishing a data communication link between the user's computer, smart phone, or similar communication device (not shown) and coordinator system 16. In this manner, a user can check up on a previously owned pet from anywhere in the world in which the user can establish a data connection with coordinator system 16.

Figure 7:
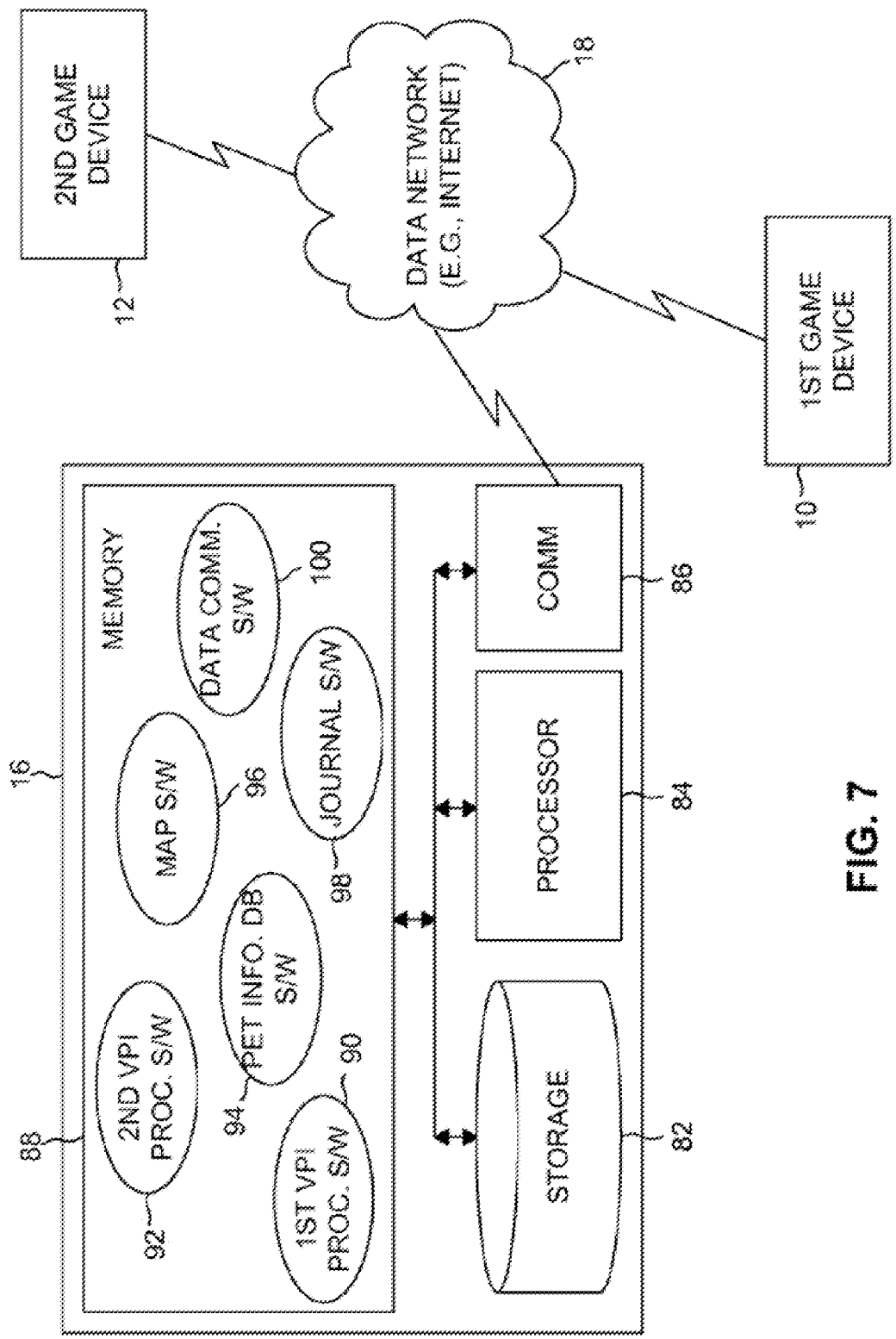
FIG. 7 is similar to FIG. 1, but includes a block diagram of an exemplary coordinator system.

As illustrated in FIG. 7, coordinator system 16 can include at least one data storage device 82, processor 84, communications interface 86, and memory 88. Storage device 82 can comprise any suitable type of data storage device or system, such as a magnetic disk drive, FLASH memory, etc. Although storage device 82 is depicted in FIG. 7 as a unitary device for purposes of clarity, it can include a combination of devices of different types. Memory 88 similarly can be of any suitable type in which software elements, such as data and programming code, are operated upon by processor 84. Communications interface 86 interfaces the above-described elements with external systems, such as data network 18. Communications interface 86 can include a wireless (radio frequency) data communication interface, such as that defined by one of the BLUETOOTH®, IEEE 802.11, WIMAX, etc., specifications. In accordance with conventional computing principles, processor 84 operates under the control of programming code or instructions. Such programming code, i.e., software elements, includes first VPI processing software 90, second VPI processing software 92, pet information database software 94, map software 96, journal software 98 and data communication software 100. Although these software elements are shown for purposes of illustration as stored or residing in memory 88, it is understood that such software elements may not reside simultaneously or in their entireties in memory 88 but rather can be retrieved in portions on an as-needed basis, e.g., in code segments, files, instruction-by-instruction, or any other suitable basis, from data storage device 82 or other suitable source (e.g., from a remote source via data network 18), in accordance with conventional computing principles. Although only the above-listed elements are shown for purposes of clarity, other software and hardware elements can be included in coordinator system 16.

It should be noted that, as programmed with the above-described software elements, the combination of processor 84, memory 88 (or other element or elements in which software elements are stored or reside) and any related elements defines a programmed processor system. The system of logic elements described above with regard to FIG. 4, arises by operation of the programmed processor system, i.e., by processor 84 executing the software elements. It should be noted that although for purposes of illustration each software element in FIG. 7 is shown as corresponding to one of the logic elements in FIG. 4, there need not be such a one-to-one correspondence. It should also be noted that the combination of software elements and the computer-readable media on which they are stored or in which they reside (e.g., memory 88, data storage device 82, one or more removable disks or similar portable media (not shown), etc.) constitutes what is referred to in the patent lexicon as a "computer program product." Persons skilled in the art to which the invention relates will readily be capable of generating or otherwise providing suitable software elements and computer program products in view of the descriptions herein of the operation of the traveling pet game system.

Figure 8:
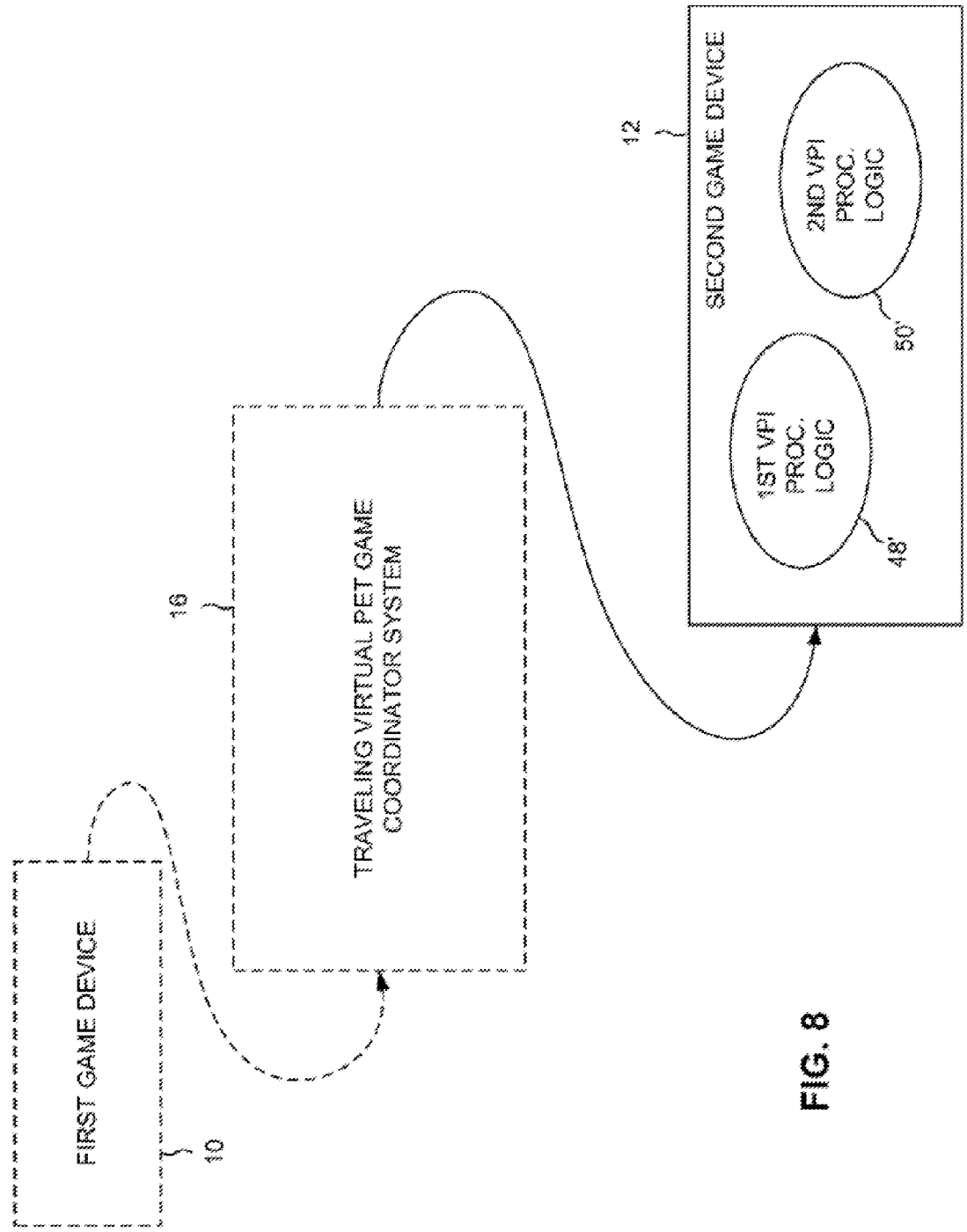
FIG. 8 is similar to FIG. 4, but an exemplary game device.

As illustrated in FIG. 8, each of game devices 10, 12, etc., can include first VPI processing logic 48' and second VPI processing logic 50' that are similar to the above-described first VPI processing logic 48 and second VPI processing logic 50 of coordinator system 16. Accordingly, as described above with regard to first VPI processing logic 48, first VPI processing logic 48' receives VPI via data network 16, where the received VPI is associated with control of a pet by a user of first game device 10. First VPI processing logic 48' processes the received VPI and processes geographic trait information associated with the pet, such as information relating to traits associated with the geographic location of first game device 10. Similarly, as described above with regard to second VPI processing logic 50, second VPI processing logic 50' processes VPI associated with control of a pet by a user of second game device 12 and processes geographic trait information associated with the pet, such as information relating to traits associated with the geographic location of second game device 12. Note that some of the processing described above with regard to first VPI processing logic 48 additionally can be performed by first VPI processing logic 48' of one of game devices 10 and 12, and some of the processing described above with regard to second VPI processing logic 50 of coordinator system 16 additionally can be performed by second VPI processing logic 50' of one of game devices 10 and 12.

Figure 9:
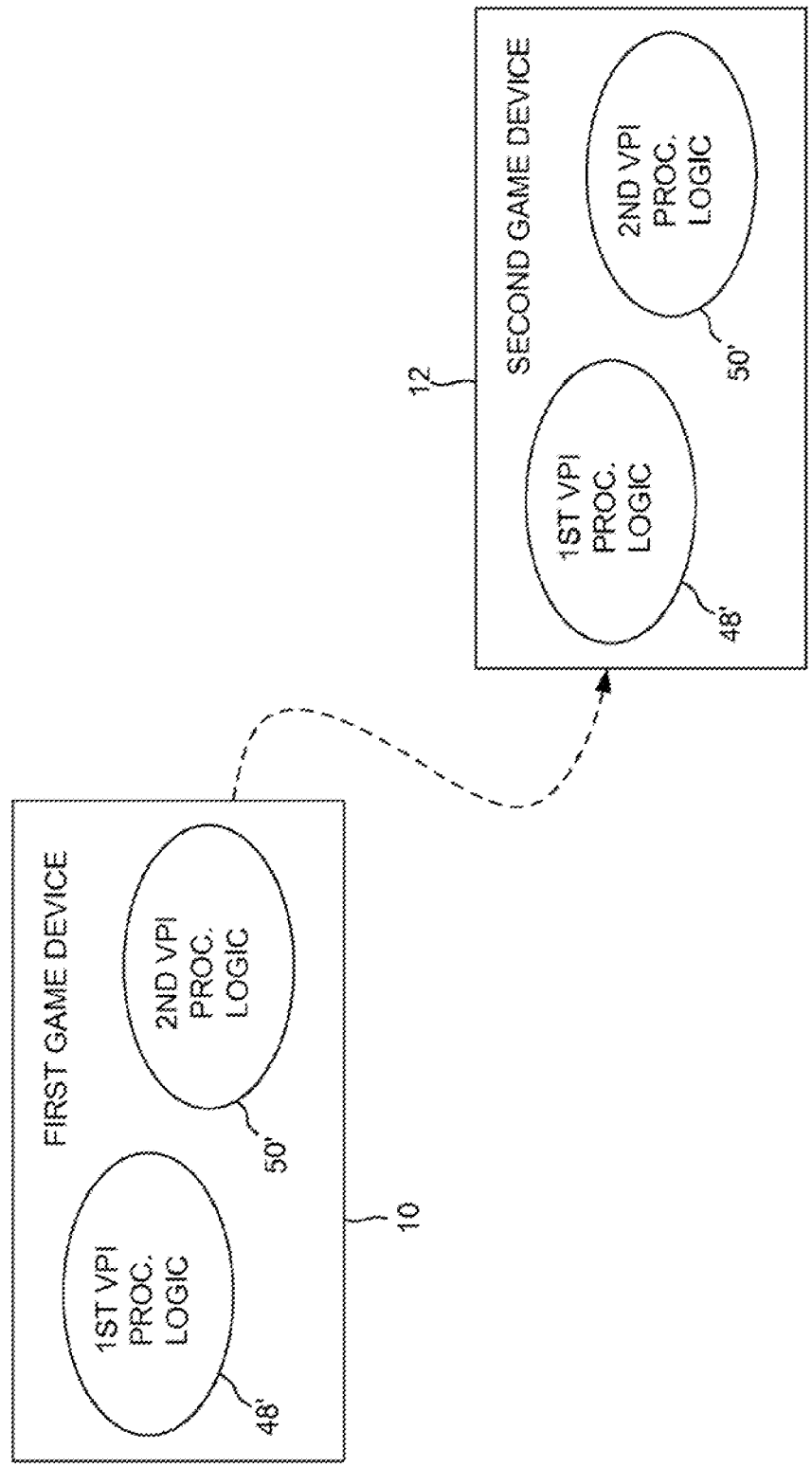
FIG. 9 is similar to FIGS. 4 and 8, but shows two interconnected exemplary game devices.

As illustrated in FIG. 9, in some instances of operation of the traveling virtual pet game, first and second game device 10 and 12 can communicate directly, without coordinator system 16 performing any processing. For example, as described above, game devices 10 and 12 can communicate with each other when two users bring their game devices 10 and 12 within a certain proximity of each other that permits establishment of a short-range radio communication link Alternatively, although not shown in FIG. 9 for purposes of clarity, game devices 10 and 12 can communicate with each other via data network 18 (FIG. 1) in a peer-to-peer manner Such a communication link can be used to facilitate the users exchanging their pets or any of the other features described above.

Figure 10:
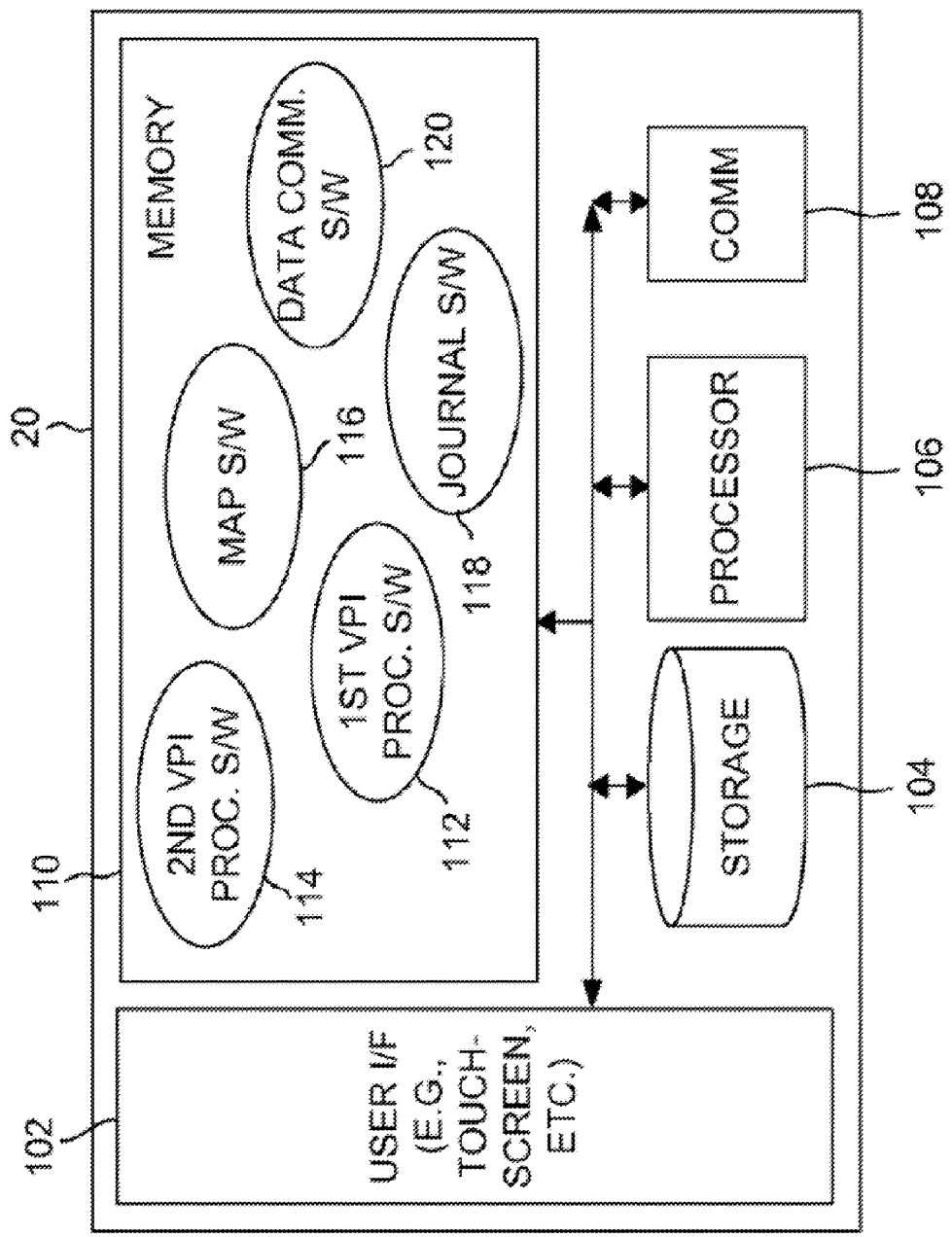
FIG. 10 is a block diagram of an exemplary game device.

As illustrated in FIG. 10, game device 20 (e.g., any of game devices 10, 12, 14, etc.) can have a structure similar to that of coordinator 16, described above with regard to FIG. 7, except that game device 20 includes a user interface 102, and some of the software elements of game device 20 can include features for interacting with the user via user interface 102. Although in the exemplary embodiment user interface 102 can include touch-screen display 22, described above with regard to FIG. 2, in other embodiments it can include any suitable user input and output devices, such as buttons, a pointing device (e.g., a joystick or trackball), indicator lamps, etc., of the types known to be useful in portable, hand-held electronic devices. Game device 20 can include a data storage device 104, processor 106, communications interface 108, and memory 110, which can be similar to those described above with regard to coordinator system 16. Also, similarly to coordinator system 16, the software elements of game device 20 can include first VPI processing software 112, second VPI processing software 114, map software 116, journal software 118 and data communication software 120. Operation of the programmed processing system defined by the combination of processor 106 and related software elements gives rise to the above-described first VPI processing logic 48', second VPI processing logic 50', and other logic (FIGS. 8-9). Although not shown for purposes of clarity, game device 20 includes a suitable battery-operated power supply and other features of the type that are commonly included in portable, hand-held devices. For example, in an embodiment in which communications interface 108 provides wireless communication, an antenna (not shown) is also included. Also, for example, a vibrating alert element can be included to notify the user of various conditions.

Note that although in some embodiments coordinator system 16 may store more information and provide more powerful processing than game device 20, any such relative differences in processing capabilities between coordinator system 16 and game device 20 do not preclude game device 20 from storing and processing at least some amount of map information, journal information, etc., in a manner similar to that described above with regard to coordinator system 16. Any of the features described above in connection with processing that occurs in coordinator system 16 in the exemplary embodiment can, in other embodiments, be provided at least in part in connection with similar processing that occurs in game device 20 (i.e., in one or more of game devices 10, 12, etc.).

It should be understood that although in the exemplary embodiment of the invention coordinator system 16 participates in the above-described feature by which pets are exchanged among users or otherwise "travel," a user can also use game device 20 (i.e., any of game devices 10, 12, etc.) in a stand-alone mode without game device 20 communicating data with coordinator system 16 or another game device at that time. The user can initiate any of the features described above that do not require simultaneous data communication with coordinator system 16 or another game device. For example, the user can initiate activities such as teaching the pet a phrase, having the pet participate in a challenge, feeding the pet, equipping the pet, etc., so long as game device 20 has pre-stored in it the relevant information such as a database of phrases. In some embodiments, pet travel can even occur to some degree in such a stand-alone mode, depending upon the information pre-stored in game device 20. For example, a user may establish a data communication link between game device 20 and coordinator system 16 only periodically, such as every few hours or every few days, and each time a data communication link is established coordinator system 16 downloads information into game device 20 that relates to other pets, geographic locations, abilities, etc. For example, a database of phrases for various countries can be downloaded into or otherwise pre-stored in game device 20, so that a list of phrases in the language associated with the new owner's geographic location can be accessed readily. The user can initiate an action or function while game device 20 is in stand-alone mode (i.e., some processing occurs), and then any remaining processing needed to complete the action but for which additional information needs to be accessed occurs the next time a data communication link is established with coordinator system 16 that facilitates access to the necessary data.

While one or more embodiments of the invention have been described as illustrative of or examples of the invention, it will be apparent to those of ordinary skill in the art that other embodiments are possible that are within the scope of the invention. Accordingly, the scope of the invention is not to be limited by such embodiments but rather is determined by the appended claims.

What is claimed is:

1. A method of operation of a traveling virtual character game, comprising:
    storing character attribute information in a coordinator data storage system, the character attribute information identifying the virtual character and specifying physical attributes of the virtual character, the physical attributes including an appearance of the virtual character;
    receiving first virtual character information at a coordinator system via a data network from a first user-operated game device, the received first virtual character information associated with control of a virtual character by the first user-operated game device and indicating a first simulation of the virtual character participating in a first activity in the first geographic region; and
    in response to reception of the first virtual character information, associating, at the coordinator system, the virtual character with first geographic trait information indicating a first visual trait of the virtual character associated with residing in the first geographic region such that the appearance of the virtual character includes the first visual trait.

2. The method of claim 1, wherein the first simulation of the virtual character participating in a first activity in the first geographic region comprises a simulation of at least one of: shopping for an item associated with the first geographic region; receiving a gift of an item associated with the first geographic region; grooming in a style associated with the first geographic region; and learning to speak a phrase in a language associated with the first geographic location.

3. The method of claim 2, wherein learning speak a phrase in a language associated with the first geographic region comprises the coordinator system transmitting information via the data network to a first user-operated game device enabling the first user-operated game device to audibly output the phrase.

4. The method of claim 1, further comprising:
    receiving second virtual character information at the coordinator system via the data network from a second user-operated game device, the received second virtual character information associated with control of the virtual character by the second user-operated game device and indicating a second simulation of the virtual character participating in a second activity in the second geographic region; and
    in response to reception of the second virtual character information, associating, at the coordinator system, the virtual character with second geographic trait information indicating a second visual trait of the virtual character associated with residing in the second geographic region such that the appearance of the virtual character includes the second visual trait.

5. The method of claim 4, further comprising, at the coordinator system in response to reception of the second virtual character information, de-associating the virtual character with the first geographic trait information such that the appearance of the virtual character no longer includes the first visual trait.

6. The method of claim 1, further comprising the coordinator system storing journal information in the coordinator data storage system, the journal information describing an aspect of a simulated experience of the virtual character in a geographic region.

7. The method of claim 6, further comprising the coordinator system:
receiving a journal request from a requesting user-operated game device;
retrieving from the coordinator data storage system stored journal information; and
transmitting retrieved journal information to the requesting user-operated game device.

8. The method of claim 1, further comprising the coordinator system storing map information in the coordinator data storage system, the map including indications of geographic regions associated with virtual character attribute information stored in the coordinator data storage system.

9. The method claimed in claim 8, further comprising the coordinator system:
receiving a map request from a requesting user-operated game device;
retrieving from the coordinator data storage system stored map information; and
transmitting retrieved map information to the requesting user-operated game device.

10. A traveling virtual pet game system, comprising:
a coordinator system that includes:
a data communications interface for communicating data via a data network with one or more remote systems to provide data communication between the coordinator system and a first and second user-operated game devices that are remote from the coordinator system via the data network;
a data storage subsystem for storing virtual pet information;
a processor system, the processor system configured to:
store character attribute information identifying the virtual character and specifying physical attributes of the virtual character, the physical attributes including an appearance of the virtual character;
receive first virtual character information via the data network from the first user-operated game device, the received first virtual character information associated with control of a virtual character by the first user-operated game device and indicating a first simulation of the virtual character participating in a first activity in the first geographic region; and
in response to reception of the first virtual character information, associate the virtual character with first geographic trait information indicating a first visual trait of the virtual character associated with residing in the first geographic region such that the appearance of the virtual character includes the first visual trait.

11. The system of claim 10, wherein the first simulation of the virtual character participating in a first activity in the first geographic region comprises a simulation of at least one of: shopping for an item associated with the first geographic region; receiving a gift of an item associated with the first geographic region; grooming in a style associated with the first geographic region; and learning to speak a phrase in a language associated with the first geographic location.

12. The system of claim 11, wherein learning speak a phrase in a language associated with the first geographic region comprises the coordinator system transmitting information via the data network to a first user-operated game device enabling the first user-operated game device to audibly output the phrase.

13. The system of claim 10, wherein the processor system is further configured to:
receive second virtual character information via the data network from the second user-operated game device, the received second virtual character information associated with control of the virtual character by the second user-operated game device and indicating a second simulation of the virtual character participating in a second activity in the second geographic region; and
in response to reception of the second virtual character information, associate the virtual character with second geographic trait information indicating a second visual trait of the virtual character associated with residing in the second geographic region such that the appearance of the virtual character includes the second visual trait.

14. The system of claim 13, wherein the processor system is further configured, in response to reception of the second virtual character information, to de-associate the virtual character with the first geographic trait information such that the appearance of the virtual character no longer includes the first visual trait.

15. The system of claim 10, wherein the processor system is further configured to store journal information in the coordinator data storage system, the journal information describing an aspect of a simulated experience of the virtual character in a geographic region.

16. The system of claim 15, wherein the processor system is further configured to:
receive a journal request from a requesting user-operated game device;
retrieve from the coordinator data storage system stored journal information; and
transmit retrieved journal information to the requesting user-operated game device.

17. The system of claim 10, wherein the processor system is further configured to store map information in the coordinator data storage system, the map including indications of geographic regions associated with virtual character attribute information stored in the coordinator data storage system.

18. The system of claim 17, wherein the processor system is further configured to:
receive a map request from a requesting user-operated game device;
retrieve from the coordinator data storage system stored map information; and
transmit retrieved map information to the requesting user-operated game device.

* * * * *